J. F. HARRISON.
BELT DRIVE MECHANISM.
APPLICATION FILED OCT. 12, 1905. RENEWED OCT. 18, 1907.

907,045.

Patented Dec. 15, 1908.

2 SHEETS—SHEET 2.

UNITED STATES PATENT OFFICE.

JOHN F. HARRISON, OF MILWAUKEE, WISCONSIN, ASSIGNOR TO ALLIS-CHALMERS COMPANY, OF MILWAUKEE, WISCONSIN, A CORPORATION OF NEW JERSEY.

BELT-DRIVE MECHANISM.

No. 907,045.      Specification of Letters Patent.      Patented Dec. 15, 1908.

Application filed October 12, 1905, Serial No. 282,379. Renewed October 18, 1907. Serial No. 398,031.

*To all whom it may concern:*

Be it known that I, JOHN F. HARRISON, a citizen of the United States, residing at Milwaukee, in the county of Milwaukee and State of Wisconsin, have invented certain new and useful Improvements in Belt-Drive Mechanism, of which the following is a specification.

This invention relates to certain improvements in a belt drive, and more particularly to those structures in which there is an element that has other movement besides rotation.

The utility of this device is apparent when applied to drive a bolter, sifter, screener, sorting machine, or any other machine wherein quick rotary movement or shaking is desirable.

Figure 1:
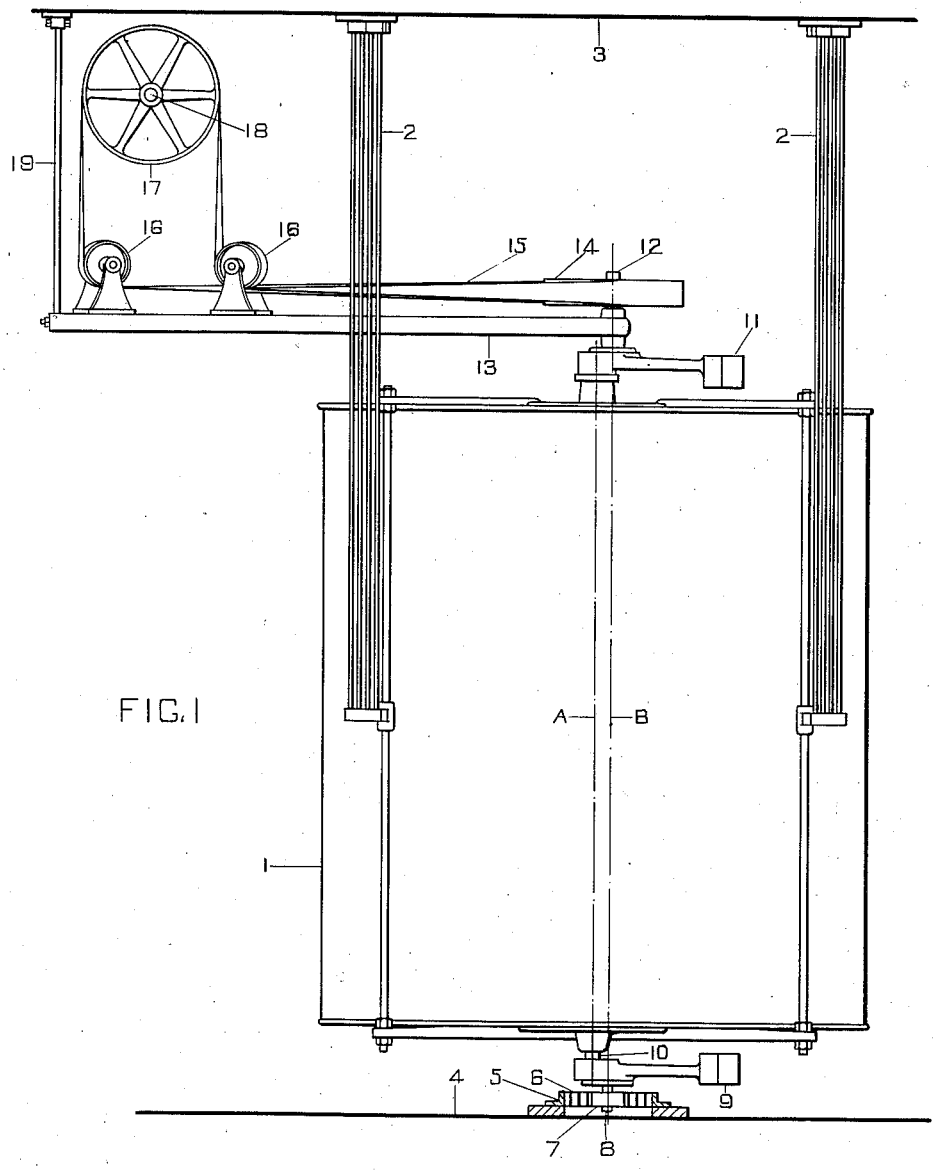
Figure 2:
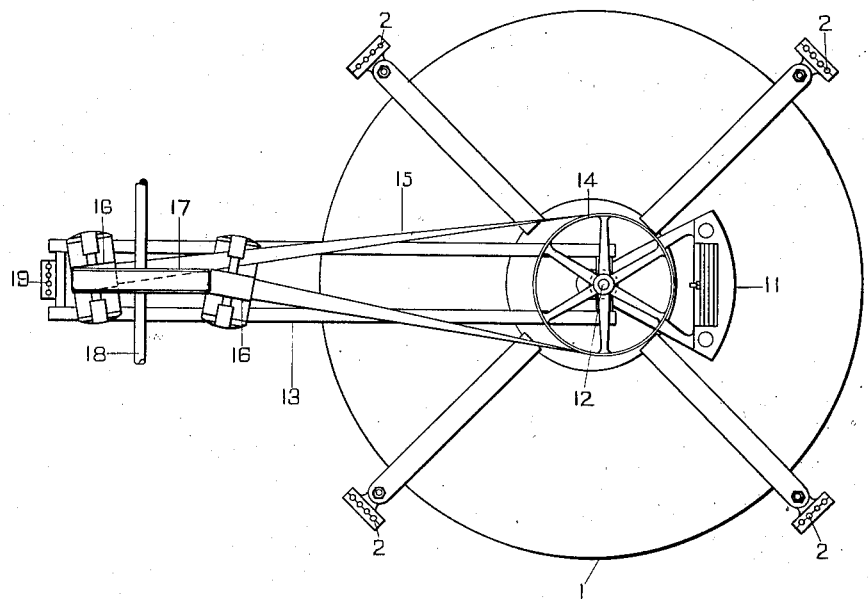

Referring to the drawings,—Figure 1 is a side elevation; and Fig. 2, a plan view of an embodiment of the invention.

The member 1 is flexibly and yieldingly suspended by rods 2 hanging from a support 3. On the base 4 is an up-standing circular flange 5 which surrounds the spiral spring 6 serving to yieldingly center the roller 7. The roller 7 is mounted upon a pin 8 carried by a weighted arm 9. The arm 9 is rigidly mounted on the shaft 10. The pin 8 being out of line with the shaft, makes this analogous to a crank structure.

At the opposite end of the member 1, the shaft 10 emerges and has mounted thereon a second weighted arm 11 which carries intermediate its weighted end and the shaft 10 a crank pin 12. Loosely mounted on this crank pin 12 is a spacing member 13, while fixed to the pin is the pulley 14. Driving the pulley 14 is the belt 15 which passes around the guide pulleys 16 and the driving pulley 17. The driving pulley 17 is mounted on the drive shaft 18. Rods 19 serve to flexibly suspend one end of the guide support or mounting. The opposite end of the mounting could be similarly supported. However, in this instance it is shown engaging the crank pin 12. The purpose of this mounting is to keep the guide pulleys spaced at a fixed distance from the pulley 14 and thereby take up whip in the belt due to movements under slow speed.

In operation the member 1 receives rapid shaking, vibratory or gyratory movements. This is brought about by the movements of the shaft 10. The shaft 10 is concentric with the member 1, that is, both have a common center line A. The crank pins 8 and 12 have a common center line B which is coincident with the center of gyration of the gyratory device 1, the weights 9 and 11 being proportioned to result in a balance structure about the crank pin center line. These crank pins 8 and 12 form means eccentric to the shaft 10.

In starting, while shaft 10 is driven slowly, the inertia of the parts will be gradually overcome by the spiral spring 6, and shaft 10 while rotating will at first have very little lateral movement. Accordingly the pins 8 and 12 will describe orbits. This orbital movement of the pin 12 tends to vibrate or whip the belt 15 driving the pulley 14. This vibration is taken care of by the guide pulley 16 permanently spaced from the pin 12.

After the drive attains normal running speed, the pins 8 and 12 cease to describe orbits and the shaft 10 describes an orbit about the axes of these pins, which then becomes the running axis. This axis remains normally in a fixed position. The spiral spring 6 operates to maintain the running axis in a fixed position.

It is claimed and desired to secure by Letters Patent,—

1. The combination of a cranked shaft freely and yieldably supported for lateral movement in any direction, the crank shaft having a bearing portion thereon near each end thereof, means to balance the shaft about the crank axis, a pulley on the crank, and a belt for the pulley.

2. The combination of a cranked shaft having a bearing portion thereon near each end thereof, means to balance the shaft about the crank axis, a pulley on the crank, a belt for the pulley, and yieldably supported guiding means for the belt.

3. The combination of a member freely and yieldably supported for lateral movement in any direction, a cranked shaft having a bearing portion thereon near each end thereof coacting with bearing portions on the member, a pulley on the crank, and a driving belt for the pulley.

4. The combination of a member freely and yieldably supported for lateral movement in any direction, a shaft supported by the member, an element eccentric to and rigid with the shaft, means to balance the member about the eccentric element, and a belt for driving the shaft through the eccentric element.

5. The combination of a shaft, yieldable supporting means therefor, a belt for driving the shaft, supporting means for the belt at one point mounted on the shaft, and separate yieldable means for mounting the belt supporting means at another point thereof.

6. The combination of a yieldably supported member, a shaft supported thereby, an eccentric means on the shaft, means to balance the member about the eccentric means, a belt for driving on the axis of the eccentric means, supporting means for the belt including guiding means mounted thereon, the belt supporting means at one point being mounted on the eccentric means, and a separate yieldable means for mounting the belt supported means at another point thereof.

7. The combination with a body mounted for vibratory motion, of a rotary shaft carried by said body and provided with a driven pulley, a driving shaft supported independently of said vibratory body and provided with a driving pulley, a link supported at one end from said vibratory body, intermediate guide pulleys mounted for vibratory movements with the outer end of said link, a support for said intermediate pulleys and the outer end of said link independent of the said vibratory body, and a driving belt running over said driving pulley, over said driven pulley, and over said intermediate guide pulleys, substantially as described.

8. The combination with a body mounted for vibratory motion, of a rotary shaft carried by said body and provided with a driven pulley, a driving shaft supported independently of said vibratory body and provided with a driving pulley, a link having one end swiveled on the shaft which is carried by the vibratory body, intermediate guide pulleys mounted for vibratory movements with the outer end of said link, a support for said intermediate pulley and the outer end of said link independent of said vibratory body, and a driving belt running over said driving pulley, over said driven pulley, and over said intermediate guide pulleys, substantially as described.

9. The combination with a body mounted for gyratory motion in a horizontal plane, of a vertical shaft carried by said body and provided with an unbalanced weight, a driven pulley on said shaft, an approximately horizontal driving shaft provided with a driving pulley, a driving belt running over said driving and driven pulleys, a link supported at one end from said vibratory body, a pair of guide pulleys mounted for vibratory movements with the outer end of said link and arranged to guide said belt approximately in the planes of said driving and driven pulleys, and a support for said guide pulleys and the outer end of said link independent of said vibratory body, substantially as described.

In testimony whereof I affix my signature in presence of two witnesses.

JOHN F. HARRISON.

Witnesses:
 John Day, Jr.,
 G. F. De Wein.